US011962911B2

United States Patent
Do et al.

(10) Patent No.: US 11,962,911 B2
(45) Date of Patent: Apr. 16, 2024

(54) ELECTRONIC DEVICE FOR PERFORMING IMAGE PROCESSING AND OPERATION METHOD THEREOF TO REDUCE ARTIFACTS IN AN IMAGE CAPTURED BY A CAMERA THROUGH A DISPLAY

(71) Applicant: Samsung Electronics Co., Ltd., Gyeonggi-do (KR)

(72) Inventors: Wonjoon Do, Gyeonggi-do (KR); Woojhon Choi, Gyeonggi-do (KR); Jaesung Choi, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/865,549

(22) Filed: Jul. 15, 2022

(65) Prior Publication Data
US 2022/0353401 A1 Nov. 3, 2022

Related U.S. Application Data

(63) Continuation of application No. PCT/KR2021/018191, filed on Dec. 3, 2021.

(30) Foreign Application Priority Data

Dec. 3, 2020 (KR) .................. 10-2020-0167458

(51) Int. Cl.
*H04N 23/71* (2023.01)
*G06T 5/00* (2006.01)
*H04N 9/64* (2023.01)
*H04N 9/68* (2023.01)
(Continued)

(52) U.S. Cl.
CPC ............. *H04N 23/71* (2023.01); *G06T 5/006* (2013.01); *H04N 9/646* (2013.01); *H04N 9/68* (2013.01); *H04N 23/64* (2023.01); *H04N 23/76* (2023.01); *H04N 23/60* (2023.01)

(58) Field of Classification Search
None
See application file for complete search history.

(56) References Cited

U.S. PATENT DOCUMENTS

| | | | |
|---|---|---|---|
| 2013/0021498 A1* | 1/2013 | Murasawa | G06T 5/002 348/222.1 |
| 2014/0254938 A1 | 9/2014 | Gu et al. | |
| 2018/0018759 A1 | 1/2018 | Granot et al. | |

(Continued)

FOREIGN PATENT DOCUMENTS

| | | |
|---|---|---|
| CN | 111028678 A | 4/2020 |
| JP | 2018-148318 A | 9/2018 |

(Continued)

*Primary Examiner* — Quan Pham
(74) *Attorney, Agent, or Firm* — Cha & Reiter, LLC

(57) ABSTRACT

According to an embodiment, an electronic device, comprises a display; a camera module disposed under the display and configured to generate an image by sensing light passing through the display; and a processor configured to determine an intensity of a light source in the image, determine whether the light source is present in a preset area in the image when the intensity of the light source is greater than a preset threshold value, and reduce one or more artifacts from or in the image when the one or more artifacts are detected in the image based on results of the determining.

22 Claims, 11 Drawing Sheets

(51) Int. Cl.
*H04N 23/60* (2023.01)
*H04N 23/76* (2023.01)

(56) References Cited

U.S. PATENT DOCUMENTS

| | | |
|---|---|---|
| 2019/0372306 A1 | 12/2019 | Reidy et al. |
| 2020/0213581 A1* | 7/2020 | Lu .......................... H04N 25/61 |
| 2020/0237212 A1 | 7/2020 | Yao et al. |
| 2021/0199952 A1* | 7/2021 | Cho ........................ G06T 5/003 |
| 2022/0036526 A1* | 2/2022 | Luo ....................... G06T 7/0002 |
| 2023/0102607 A1* | 3/2023 | Nakata ................... H04N 23/76 |
| | | 348/223.1 |
| 2023/0142989 A1* | 5/2023 | Yakura ................... H04N 23/45 |
| | | 348/207.99 |

FOREIGN PATENT DOCUMENTS

| | | | |
|---|---|---|---|
| JP | 2019-530322 A | 10/2019 | |
| JP | 2020-18840 A | 2/2020 | |
| KR | 10-2016-0068463 A | 6/2016 | |
| KR | 10-2016-0148438 A | 12/2016 | |
| KR | 10-2018-0055300 A | 5/2018 | |
| KR | 10-2020-0084419 A | 7/2020 | |
| WO | 2016/203760 A1 | 12/2016 | |

* cited by examiner

ELECTRONIC DEVICE FOR PERFORMING IMAGE PROCESSING AND OPERATION METHOD THEREOF TO REDUCE ARTIFACTS IN AN IMAGE CAPTURED BY A CAMERA THROUGH A DISPLAY

CROSS-REFERENCE TO RELATED APPLICATIONS

This application is a continuation of U.S. National Stage application under 35 U.S.C. § 371 of an International application number PCT/KR2021/018191, filed on Dec. 3, 2021, which is based on and claims the benefit under 35 USC § 119(a) of Korean Patent Application No. 10-2020-0167458 filed on Dec. 3, 2020, in the Korean Intellectual Property Office, the disclosure of which is incorporated by reference herein in its entirety.

BACKGROUND

1. Field

The disclosure relates to an electronic device performing image processing and an operation method of the electronic device.

2. Description of Related Art

A portable electronic device such as a smartphone may be limited in size for easy portability. Technological development has enabled a gradual increase in the proportion of a screen in a portable electronic device and a gradual decrease in a bezel that corresponds to an edge of the screen. For example, a screen may occupy most of one surface of a portable electronic device, and an area in which at least one sensor is disposed may be hidden from view. As the proportion of the screen occupied within a limited size is maximized, various sensors may be disposed under the screen (e.g., a display) and may thus become invisible on the outside.

SUMMARY

An image captured by a camera module disposed under a display may have at least one artifact occurring due to a characteristic of an arrangement under the display. For example, there may be light blurring and/or light splitting occurring due to strong diffraction around a light source. Alternatively, there may be a pattern in the image that is based on a structural shape of the display occurring due to internally reflected light that is not intended. Alternatively, there may be a rainbow artifact and/or an under-display camera (UDC) flare artifact.

Embodiments of the disclosure may provide an electronic device configured to detect one or more artifacts in an image captured by a camera module disposed under a display and remove or reduce the detected artifacts.

Embodiments of the disclosure may also provide an electronic device configured to selectively remove or reduce an artifact detected in a captured image through a light source analysis, while implementing a display in a complete form without an intermediate area in which a screen is not displayed, through an arrangement of a camera module under the display.

According to an embodiment, an electronic device, comprises a display; a camera module disposed under the display and configured to generate an image by sensing light passing through the display; and a processor configured to determine an intensity of a light source in the image, determine whether the light source is present in a preset area in the image when the intensity of the light source is greater than a preset threshold value, and reduce one or more artifacts from or in the image when the one or more artifacts are detected in the image based on results of the determining.

According to an embodiment, an operation method of an electronic device, comprises: determining an intensity of a light source in an image obtained by a camera module disposed under a display; in response to the intensity of the light source being greater than a preset threshold value, determining whether the light source is present in a preset area in the image; and in response to one or more artifacts being detected in the image, reducing the artifacts from or in the image based on results of the determining.

an operation method of an electronic device includes determining an intensity of a light source in an image obtained by a camera module disposed under a display, determining whether the light source is present in a preset area in the image in response to the intensity of the light source being greater than a preset threshold value, and removing or reducing one or more artifacts from or in the image based on results of the determining in response to the one or more artifacts being detected in the image.

According to various embodiments described herein, it is possible to robustly detect even an artifact that appears overlapping a captured image and is thus not easy to be identifiable by detecting, through a light source analysis, various artifacts that may occur in a structure in which a camera module is disposed under a display.

According to various embodiments described herein, it is possible to prevent unnecessary operations from being performed by selectively removing or reducing a detected artifact through a light source analysis.

Other features and aspects will be apparent from the following detailed description, the drawings, and the claims.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
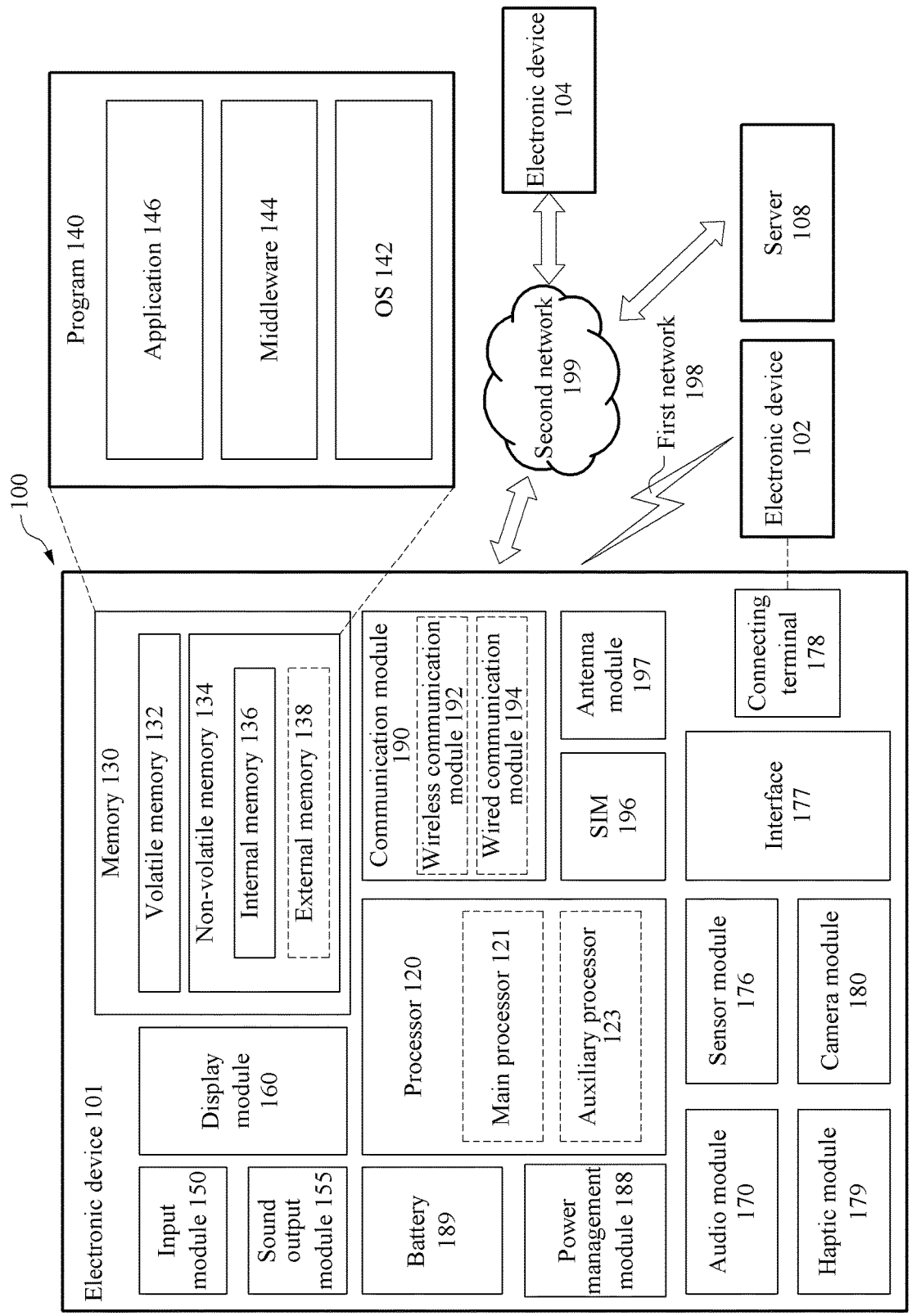
FIG. 1 is a block diagram illustrating an example electronic device in a network environment according to various embodiments.

Hereinafter, various example embodiments will be described in greater detail with reference to the accompanying drawings. When describing the example embodiments with reference to the accompanying drawings, like reference numerals refer to like elements and a repeated description related thereto will be omitted.

FIG. 1 is a block diagram illustrating an example electronic device in a network environment according to various embodiments. Referring to FIG. 1, an electronic device 101 in a network environment 100 may communicate with an electronic device 102 via a first network 198 (e.g., a short-range wireless communication network), or communicate with at least one of an electronic device 104 and a server 108 via a second network 199 (e.g., a long-range wireless communication network). According to an example embodiment, the electronic device 101 may communicate with the electronic device 104 via the server 108. According to an example embodiment, the electronic device 101 may include a processor 120, a memory 130, an input module 150, a sound output module 155, a display module 160, an audio module 170, and a sensor module 176, an interface 177, a connecting terminal 178, a to haptic module 179, a camera module 180, a power management module 188, a battery 189, a communication module 190, a subscriber identification module (SIM) 196, or an antenna module 197. In some example embodiments, at least one (e.g., the connecting terminal 178) of the above components may be omitted from the electronic device 101, or one or more other components may be added in the electronic device 101. In some example embodiments, some (e.g., the sensor module 176, the camera module 180, or the antenna module 197) of the components may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. According to an example embodiment, as at least a part of data processing or computation, the processor 120 may store a command or data received from another component (e.g., the sensor module 176 or the communication module 190) in a volatile memory 132, process the command or data stored in the volatile memory 132, and store resulting data in a non-volatile memory 134. According to an example embodiment, the processor 120 may include a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, or a communication processor (CP)) that is operable independently of, or in conjunction with, the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display device 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to an example embodiment, the auxiliary processor 123 (e.g., an ISP or a CP) may be implemented as a portion of another component (e.g., the camera module 180 or the communication module 190) that is functionally related to the auxiliary processor 123. According to an example embodiment, the auxiliary processor 123 (e.g., an NPU) may include a hardware structure specified for artificial intelligence (AI) model processing. An AI model may be generated by machine learning. Such learning may be performed by, for example, the electronic device 101 in which the AI model is performed, or performed via a separate server (e.g., the server 108). Learning algorithms may include, but are not limited to, for example, supervised learning, unsupervised learning, semi-supervised learning, or reinforcement learning. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The AI model may alternatively or additionally include a software structure other than the hardware structure.

The memory 130 may store various data used by at least one component (e.g., the processor 120 or the sensor module 176) of the electronic device 101. The data may include, for example, software (e.g., the program 140) and input data or output data for a command related thereto. The memory 130 may include the volatile memory 132 or the non-volatile memory 134. The non-volatile memory 134 may include an internal memory 136 and an external memory 138.

The program 140 may be stored as software in the memory 130, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing records. The receiver may be used to receive an incoming call. According to an example embodiment, the receiver may be implemented separately from the speaker or as a part of the speaker.

The display module 160 may visually provide information to the outside (e.g., a user) of the electronic device 101. The display module 160 may include, for example, a display, a hologram device, or a projector, and a control circuitry to control a corresponding one of the display, the hologram device, and the projector. According to an example embodiment, the display module 160 may include a touch sensor adapted to sense a touch, or a pressure sensor adapted to measure an intensity of a force incurred by the touch.

The audio module 170 may convert a sound into an electric signal or vice versa. According to an example embodiment, the audio module 170 may obtain the sound via the input module 150 or output the sound via the sound output module 155 or an external electronic device (e.g., the electronic device 102 such as a speaker or a headphone) directly or wirelessly connected to the electronic device 101.

The sensor module 176 may detect an operational state (e.g., power or temperature) of the electronic device 101 or an environmental state (e.g., a state of a user) external to the electronic device 101, and generate an electric signal or data value corresponding to the detected state. According to an example embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with an external electronic device (e.g., the electronic device 102) directly (e.g., wiredly) or wirelessly. According to an example embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to an example embodiment, the connecting terminal 178 may include, for example, an HDMI connector, a USB connector, an SD card connector, or an audio connector (e.g., a headphone connector).

The haptic module 179 may convert an electric signal into a mechanical stimulus (e.g., a vibration or a movement) or an electrical stimulus which may be recognized by a user via his or her tactile sensation or kinesthetic sensation. According to an example embodiment, the haptic module 179 may include, for example, a motor, a piezoelectric element, or an electric stimulator.

The camera module 180 may capture a still image and moving images. According to an example embodiment, the camera module 180 may include one or more lenses, image sensors, ISPs, or flashes.

The power management module 188 may manage power supplied to the electronic device 101. According to an example embodiment, the power management module 188 may be implemented as, for example, at least a part of a power management integrated circuit (PMIC).

The battery 189 may supply power to at least one component of the electronic device 101. According to an example embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and an external electronic device (e.g., the electronic device 102, the electronic device 104, or the server 108) and performing communication via the established communication channel. The communication module 190 may include one or more communication processors that are operable independently of the processor 120 (e.g., an AP) and that support direct (e.g., wired) communication or wireless communication. According to an example embodiment, the communication module 190 may include a wireless communication module 192 (e.g., a cellular communication module, a short-range wireless communication module, a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN)). These various types of communication modules may be implemented as a single component (e.g., a single chip), or may be implemented as multiple components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and a next-generation communication technology, e.g., a new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beamforming, or a large scale antenna. The wireless communication module 192 may support various requirements specified in the electronic device 101, an external electronic device (e.g., the electronic device 104), or a network system (e.g., the second network 199). According to an example embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., an external electronic device) of the electronic device 101. According to an example embodiment, the antenna module 197 may include an antenna including a radiating element including a conductive material or a conductive pattern formed in or on a substrate (e.g., a printed circuit board (PCB)). According to an example embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or the power may be transmitted or received between the communication module 190 and the external electronic device via the at least one selected antenna. According to an example embodiment, another component (e.g., a radio frequency integrated circuit (RFIC)) other than the radiating element may be additionally formed as a part of the antenna module 197.

According to various example embodiments, the antenna module 197 may form a mmWave antenna module. According to an example embodiment, the mmWave antenna module may include a PCB, an RFIC disposed on a first surface (e.g., a bottom surface) of the PCB or adjacent to the first surface and capable of supporting a designated high-frequency band (e.g., the mmWave band), and a plurality of antennas (e.g., array antennas) disposed on a second surface (e.g., a top or a side surface) of the PCB or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general-purpose input and output (GPIO), serial peripheral interface (SPI), or mobile industry processor interface (MIPI)).

According to an example embodiment, commands or data may be transmitted or received between the electronic device 101 and the external electronic device 104 via the server 108 coupled with the second network 199. Each of the external electronic devices 102 and 104 may be a device of the same type as or a different type from the electronic device 101. According to an example embodiment, all or some of operations to be executed by the electronic device 101 may be executed at one or more of the external electronic devices 102, 104, and 108. For example, if the electronic device 101 needs to perform a function or a service automatically, or in response to a request from a user or another device, the electronic device 101, instead of, or in addition to, executing the function or the service, may request one or more external electronic devices to perform at least a part of the function or the service. The one or more external electronic devices receiving the request may perform the at least part of the function or the service requested, or an additional function or an additional service related to the request, and may transfer an outcome of the performing to the electronic device 101. The electronic device 101 may provide the outcome, with or without further processing of the outcome, as at least a part of a reply to the request. To that end, a cloud computing, distributed computing, mobile edge computing (MEC), or client-server computing technology may be used, for example. The electronic device 101 may provide ultra-low latency services using, e.g., distributed computing or mobile edge computing. In an example embodiment, the external electronic device 104 may include an Internet-of-things (IoT) device. The server 108 may be an intelligent server using machine learning and/or a neural network. According to an example embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
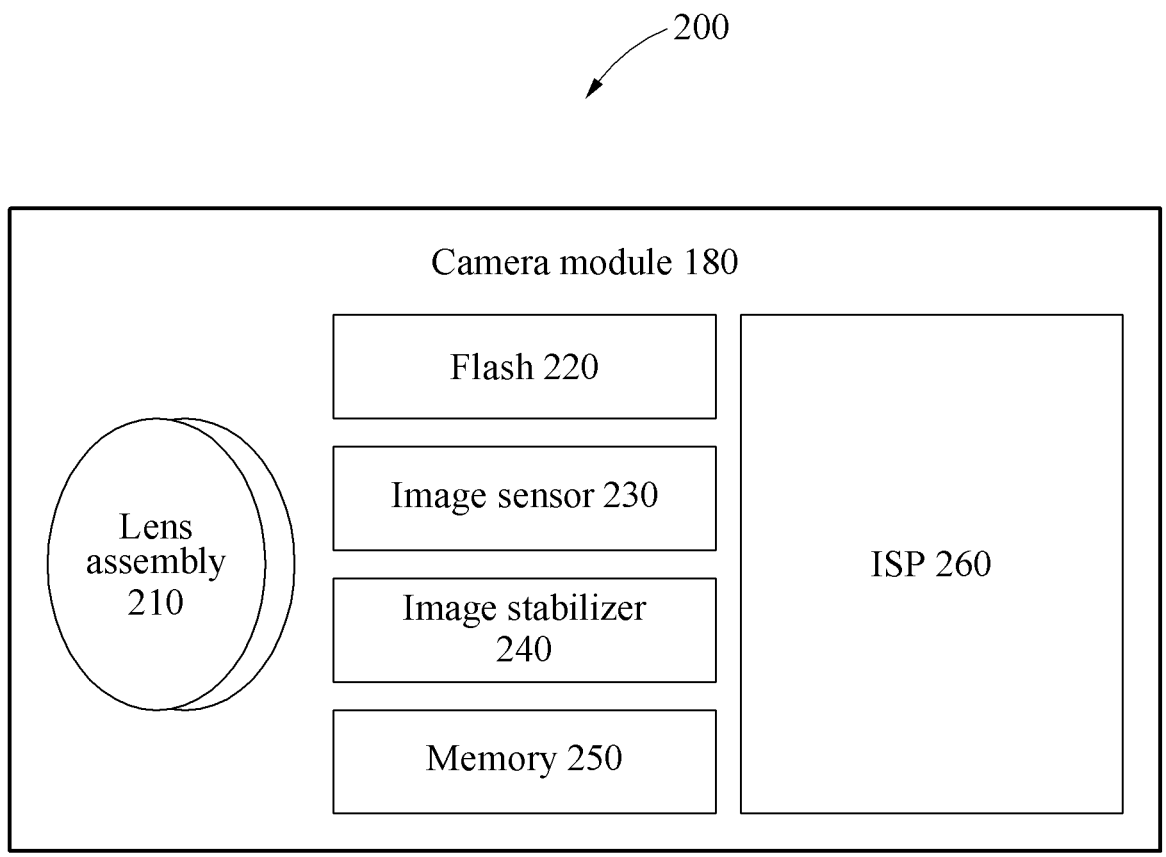
FIG. 2 is a block diagram illustrating an example camera module according to various embodiments.

FIG. 2 is a block diagram illustrating an example camera module according to various embodiments.

Referring to FIG. 2, the camera module 180 may include a lens assembly 210, a flash 220, an image sensor 230, an image stabilizer 240, a memory 250 (e.g., a buffer memory), or an image signal processor (ISP) 260. In some example embodiments, at least one of the components (e.g., the flash 220) may be omitted from the camera module 180, or one or more other components may be added in the camera module 180.

The lens assembly 210 may collect light emitted from an object that is a target of which an image is to be captured. The lens assembly 210 may include one or more lenses. According to an example embodiment, the camera module 180 may include a plurality of lens assemblies 210. In this case, the camera module 180 may constitute, for example, a dual camera, a 360-degree camera, or a spherical camera. Some of the lens assemblies 210 may have the same lens properties (e.g., an angle of view, a focal length, an auto focus, an f number, or an optical zoom), or at least one of the lens assemblies 210 may have one or more lens properties that are different from those of other lens assemblies. The lens assembly 210 may include, for example, a wide-angle lens or a telephoto lens.

The flash 220 may emit light to be used to enhance light emitted or reflected from the object. According to an example embodiment, the flash 220 may include one or more light emitting diodes (LEDs) (e.g., a red-green-blue (RGB) LED, a white LED, an infrared (IR) LED, or an ultraviolet (UV) LED), or a xenon lamp. The image sensor 230 may obtain an image corresponding to the object by converting, into an electrical signal, the light emitted or reflected from the object and transmitted through the lens assembly 210. According to an example embodiment, the image sensor 230 may include, for example, one image sensor selected from among image sensors having different properties, such as, for example, an RGB sensor, a black and white (BW) sensor, an IR sensor, or a UV sensor, a plurality of image sensors having the same property, or a plurality of image sensors having different properties. Each image sensor included in the image sensor 230 may be implemented using, for example, a charged coupled device (CCD) sensor or a complementary metal-oxide-semiconductor (CMOS) sensor.

The image stabilizer 240 may move at least one lens included in the lens assembly 210 or the image sensor 230 in a specific direction, or control an operation characteristic of the image sensor 230, in response to a movement of the camera module 180 or the electronic device 101 including the camera module 180. For example, the image stabilizer 240 may adjust a read-out timing. This may compensate for at least a part of a negative effect of the movement on an image to be captured. According to an example embodiment, the image stabilizer 240 may sense such a movement of the camera module 180 or the electronic device 101 using a gyro sensor (not shown) or an acceleration sensor (not shown) disposed inside or outside the camera module 180. According to an example embodiment, the image stabilizer 240 may be implemented as, for example, an optical image stabilizer. The memory 250 may temporarily store therein at least a portion of the image obtained through the image sensor 230 for a subsequent image processing operation. For example, when image acquisition is delayed by a shutter or a plurality of images is obtained at a high speed, an obtained original image (e.g., a Bayer-patterned image or a high-resolution image) may be stored in the memory 250 and a copy image (e.g., a low-resolution image) corresponding the original image may be previewed through the display module 160. Subsequently, when a specified condition (e.g., a user input or a system command) is satisfied, at least a portion of the original image stored in the memory 250 may be obtained and processed by, for example, the ISP 260. According to an example embodiment, the memory 250 may be configured as at least a part of the memory 130 or as a separate memory operated independently of the memory 130.

The ISP 260 may perform one or more image processing operations on an image obtained through the image sensor 230 or an image stored in the memory 250. The image processing operations may include, for example, depth map generation, three-dimensional (3D) modeling, panorama generation, feature point extraction, image synthesis, or image correction or compensation (e.g., noise reduction, resolution adjustment, brightness adjustment, blurring, sharpening, or softening). Alternatively or additionally, the ISP 260 may control at least one (e.g., the image sensor 230) of the components included in the camera module 180. For example, the ISP 260 may control an exposure time, a read-out timing, and the like. The image processed by the ISP 260 may be stored again in the memory 250 for further processing, or be provided to an external component (e.g., the memory 130, the display module 160, the electronic device 102, the electronic device 104, or the server 108) of the camera module 180. According to an example embodiment, the ISP 260 may be configured as at least a part of the processor 120 or as a separate processor operated independently of the processor 120. When the ISP 260 is configured as a processor separate from the processor 120, at least one image processed by the ISP 260 may be displayed, through the display module 160, as it is without a change or after additional image processing, by the processor 120.

According to an example embodiment, the electronic device 101 may include a plurality of camera modules 180 having different properties or functions. In this case, for example, at least one of the camera modules 180 may be a wide-angle camera, and at least another one of the camera modules 180 may be a telephoto camera. Similarly, at least one of the camera modules 180 may be a front camera, and at least another one of the camera modules 180 may be a rear camera.

An electronic device according to various embodiments of the present disclosure may be a device of various types. The electronic device may include, for example, a portable communication device (e.g., a smartphone, etc.), a computing device, a portable multimedia device, a portable medical device, a camera, a wearable device, or a home appliance. However, the electronic device is not limited to the foregoing examples.

It should be construed that various example embodiments of the present disclosure and the terms used therein are not intended to limit the technological features set forth herein to some particular embodiments but include various changes, equivalents, or replacements of the example embodiments. In connection with the description of the drawings, like reference numerals may be used for similar or related components. It should be understood that a singular form of a noun corresponding to an item may include one or more of the things, unless the relevant context clearly indicates otherwise. As used herein, "A or B," "at least one of A and B," "at least one of A or B," "A, B, or C," "at least one of A, B, and C," and "A, B, or C," each of which may include any one of the items listed together in the corresponding one of the phrases, or all possible combinations thereof. Although terms of "first" or "second" are used to explain various components, the components are not limited to the terms. These terms should be used only to distinguish one component from another component. For example, a "first" component may be referred to as a "second" component, or similarly, and the "second" component may be referred to as the "first" component within the scope of the right according to the concept of the present disclosure. It should also be understood that, when a component (e.g., a first component) is referred to as being "connected to" or "coupled to" another component with or without the term "functionally" or "communicatively," the component can be connected or coupled to the other component directly (e.g., wiredly), wirelessly, or via a third component.

As used in connection with various example embodiments of the disclosure, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an example embodiment, the module may be implemented in the form of an application-specific integrated circuit (ASIC).

Various example embodiments as set forth herein may be implemented as software (e.g., the program 140) including one or more instructions that are stored in a storage medium (e.g., the internal memory 136 or the external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to various example embodiments, a method according to an example embodiment of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various example embodiments, each component (e.g., a module or a program) of the above-described components may include a single entity or multiple entities, and some of the multiple entities may be separately disposed in different components. According to various example embodiments, one or more of the above-described components or operations may be omitted, or one or more other components or operations may be added. Alternatively or additionally, a plurality of components (e.g., modules or programs) may be integrated into a single component. In such a case, according to various example embodiments, the integrated component may still perform one or more functions of each of the plurality of components in the same or similar manner as they are performed by a corresponding one of the plurality of components before the integration. According to various example embodiments, operations performed by the module, the program, or another component may be carried out sequentially, in parallel, repeatedly, or heuristically, or one or more of the operations may be executed in a different order or omitted, or one or more other operations may be added.

Figure 3:
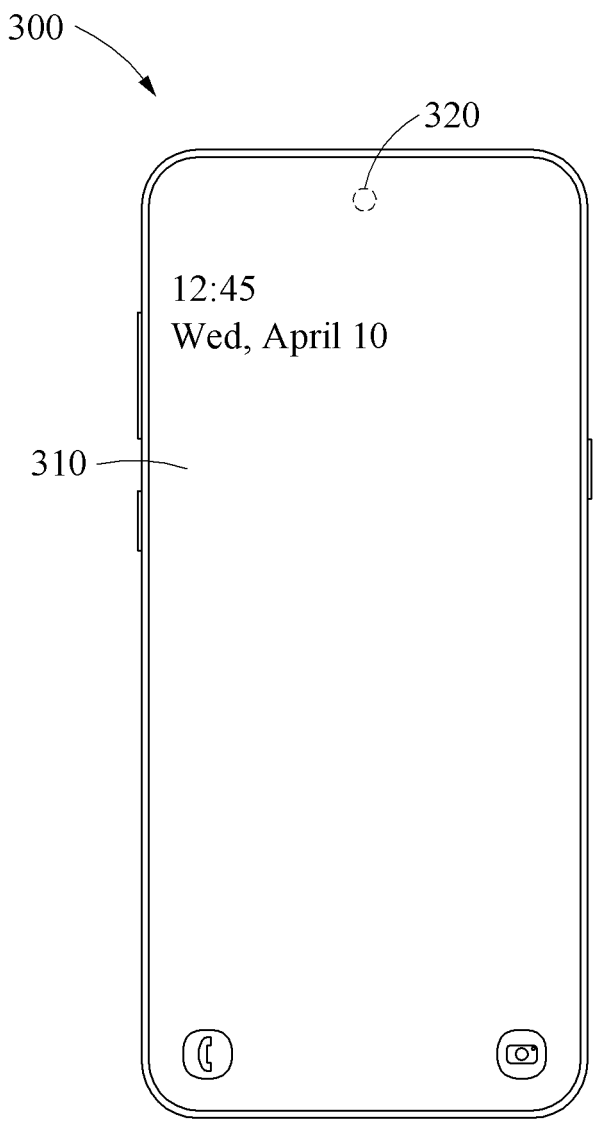
FIG. 3 is a diagram illustrating an example electronic device in which a camera module is embedded according to various embodiments.

FIG. 3 is a diagram illustrating an example electronic device in which a camera module is embedded according to various embodiments.

Referring to FIG. 3, an electronic device 300 (e.g., the electronic device 101 of FIG. 1) may include a camera module 320 (e.g., the camera module 180 of FIG. 1 or 2)

under a display 310 (e.g., the display module 160 of FIG. 1). Although a smartphone is illustrated as an example of the electronic device 300 in FIG. 3, the electronic device 300 in which the camera module 320 is embedded is not limited thereto, and any device including the display 310 may be applied without limitation.

The camera module 320 may be disposed inside the electronic device 300 without being exposed to the outside, and the camera module 320 being disposed as such may be referred to as an under-display camera (UDC). Since the camera module 320 is disposed inside the electronic device 300, an area in which the camera module 320 is disposed may also be implemented as a display area. Thus, for the display area of a maximum size, the display 310 may be implemented to have a complete form (e.g., a form without an area in which a screen is not displayed in an intermediate area of the display 310) on one surface of the electronic device 300, without a need to implement the display 310 in the form of a notch or to arrange a portion of the camera module 320 to be exposed to a portion of the intermediate area of the display 310.

The camera module 320 disposed inside the electronic device 300 may generate an image by sensing external light passing through the display 310. The display 310 may be a device configured to display an image using a plurality of pixels, and the pixels and/or wires may be regularly arranged according to a display characteristic. This causes certain distortions. Such a regular structure may be a cause of generating strong diffraction of light passing through the display 310 and reaching the camera module 320. Due to this, at least one artifact may occur in an image generated by the camera module 320. For example, when an image of a bright light source such as lighting or the sun is captured, light blurring and/or light splitting may occur due to strong diffraction around the light source, and thus information may be lost or a color may be distorted in the image generated by the camera module 320. Alternatively, a pattern based on a structural shape of the display 310 may appear in the image due to internally reflected light that is unintended. Alternatively, a rainbow artifact and/or an UDC flare artifact may occur. Detailed examples of at least one artifact appearing in an image will be described later.

For various artifacts that may occur in a UDC structure, image processing for detecting whether an artifact occurs in an image obtained by the camera module 320 and removing or reducing the detected artifact may be desirable. The electronic device 300 may further include a processor (not shown) (e.g., the processor 120 of FIG. 1) for performing such image processing. The image processing may include an operation of correcting the image obtained by the camera module 320. For example, a corrected image obtained after the correcting may be an image from or in which at least one artifact is removed or reduced. Alternatively, the corrected image may appear similar to an image captured by a camera module of which a portion is exposed to the outside. Examples of the image processing are illustrated in FIGS. 4A and 4B.

Figure 4A:
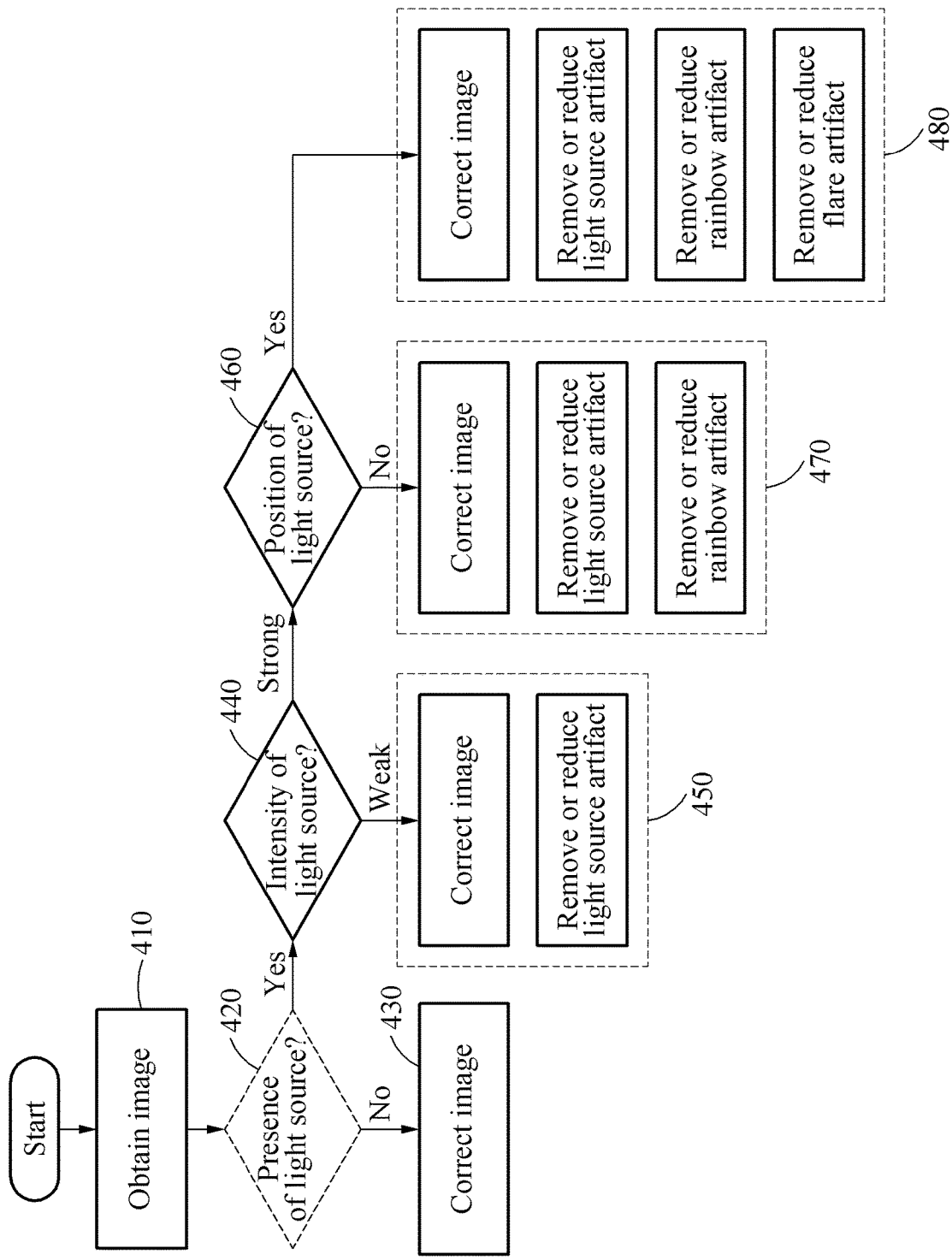
FIGS. 4A and 4B are flowcharts illustrating example flows of operations for image processing according to various embodiments.
Figure 4B:
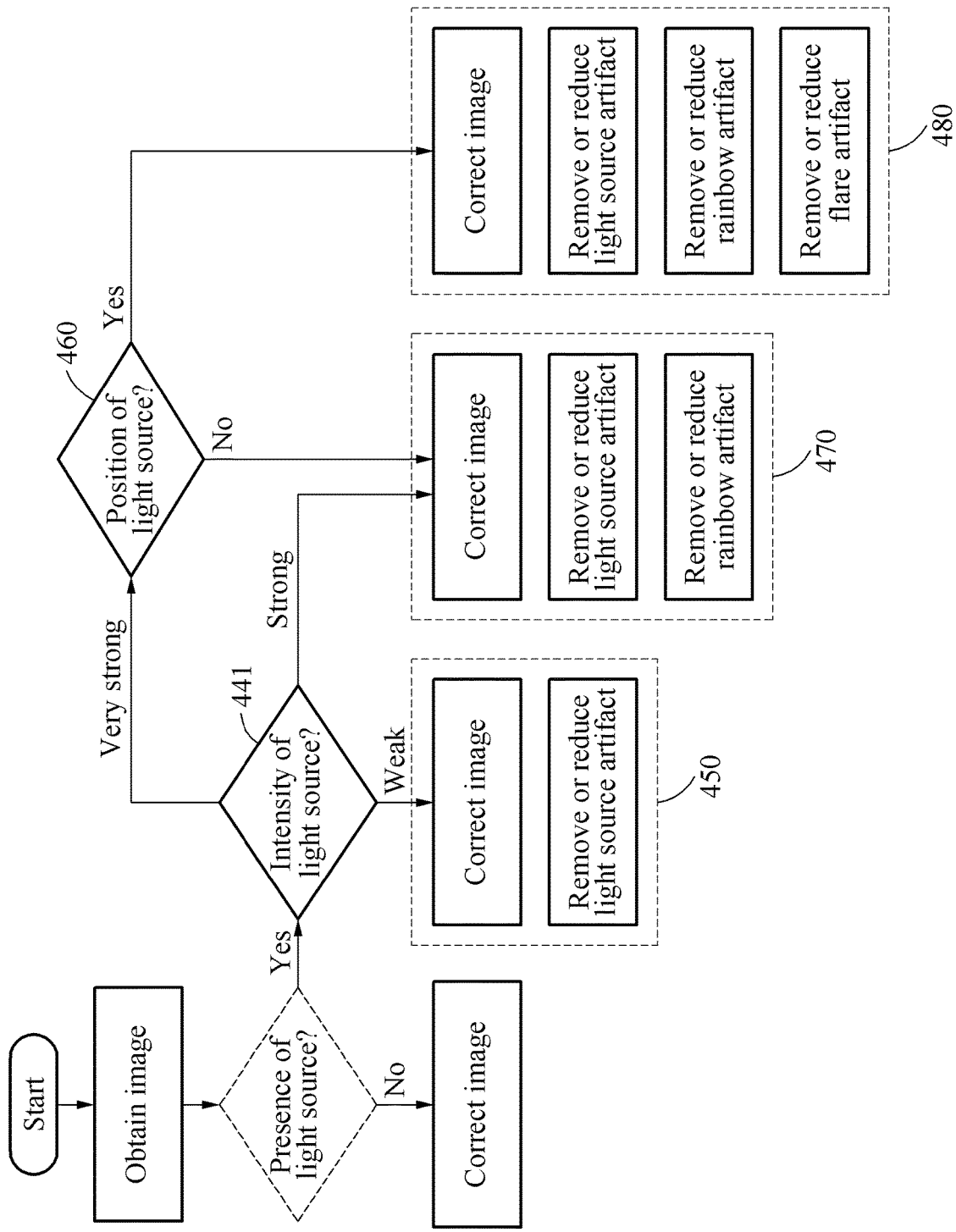

FIGS. 4A and 4B are flowcharts illustrating example flows of operations for image processing according to various embodiments.

FIG. 4A is a flowchart illustrating an example operation method performed by an electronic device for image processing according to various embodiments. The operation method determines whether image includes a light source. If the image includes a light source, the light source artifacts are removed or reduced. If the intensity of the light source is strong, the rainbow artifact is reduced or removed. If the position of the light source is in a preset area or overlaps the preset area by a preset ratio or greater a flare artifact is also removed.

In the following examples, operations may be performed sequentially, but not be necessarily performed sequentially. For example, the operations may be performed in different orders, and at least two of the operations may be performed in parallel. For example, an electronic device of FIGS. 4A and 4B may be the electronic device 101 of FIG. 1 or the electronic device 300 of FIG. 3. Operations 410 through 480 to be described hereinafter may be performed by at least one component (e.g., the processor 120 of FIG. 1 and/or the ISP 260 of FIG. 2) of the electronic device (e.g., the electronic device 101).

In operation 410, the electronic device may obtain an image by sensing light passing through a display (e.g., the display module 160 of FIG. 1 or the display 310 of FIG. 3) through a camera module (e.g., the camera module 180 of FIG. 1) disposed under the display. The electronic device may obtain an image captured by the camera module or a preview image generated in real time by the camera module, according to a user manipulation or a predetermined setting. The image may be sensed by the image sensor 230 and stored in memory. For example, the user manipulation may include pressing a capture (or shoot) button by a user, and the predetermined setting may include at least one of timer shooting by which an image is captured after a preset time elapses, voice shooting by which an image is captured when a user utters a predetermined word, or gesture shooting by which an image is captured when a user takes a predetermined gesture. Also, the electronic device may obtain a preview image immediately before capturing an image.

In operation 420, the electronic device may determine whether a light source is included in the obtained image. For example, the electronic device may determine whether the light source is included in the image through signal processing that is based on a shape and size of a saturated pixel area. Hereinafter, a saturated pixel (or saturated pixel area) of an image may indicate that a pixel value (e.g., at least one of RGB pixel values) represented by a pixel included in the image exceeds a threshold pixel value. For example, the electronic device may determine, to be saturated, a pixel in an image having a value greater than or equal to a first threshold value. In this example, when the size of the saturated pixel area is greater than or equal to a second threshold value and a shape of the saturated pixel area corresponds to a shape of a light source (e.g., a point light source, a linear light source, or a surface light source) or a shape of a light source distorted according to the diffraction characteristic of a physical structure of the display, the electronic device may determine that the light source is included in the image. For another example, the electronic device may determine the presence or absence of a light source using a neural network-based classifier. The classifier may include a model trained in advance based on machine learning, for example, a neural network, a support vector machine (SVM), a hidden Markov model (HMM), and a Bayesian model. That is, the classifier may be subjected to images that are known to include or not include a light source. This can occur, during manufacture. Additionally, according to certain embodiments, the electronic device can ask the user for feedback to improve the model. For example, the model may be trained to output a value indicating the presence of a light source when an image including the light source is input, and output a value indicating the absence of a light source when an image without the light source is input.

According to an example embodiment, the classifier may be a program module executed in a processor of the electronic device. For example, the classifier may be executed in the processor 120 of FIG. 1 or the ISP 260 of FIG. 2.

According to an example embodiment, operation 420 may be omitted to reduce an amount of unnecessary computation. For example, when the neural network is trained with training data including light sources, operation 420 of determining the presence or absence of a light source does not need to be performed, and the electronic device may perform operations from operation 440.

Operation 420 of determining whether a light source is included in the image maybe performed to determine the presence of a light source artifact, a rainbow artifact, and/or an UDC flare artifact in the image. In response to a determination (No in operation 420) that a light source is not included in the image, operation 430 may be performed subsequently to operation 420. In response to a determination (Yes in operation 420) that a light source is included in the image, operation 440 may be performed subsequently to operation 420.

In operation 430, the electronic device may compensate for at least one of a resolution decrease and/or a signal-to-noise ratio (SNR) decrease that occurs in the image due to optical diffraction occurring due to a structural characteristic of the display. For example, when the camera module generates an image by sensing light passing through the display, the light passing through the display may be diffracted because pixels and/or wires are arranged in a regular structure in the display, and thus a resolution may be degraded, compared to an image captured by a camera module exposed to the outside. For example, when the camera module generates an image by sensing light passing through the display, the pixels and/or wires in the display may reduce the transmission of the light, and thus an SNR may be greatly degraded. Such image degradation may occur due to the structural characteristic regardless of the presence or absence of a light source, and may thus need to be compensated for even when it is determined that a light source is not included in an image. For example, the image degradation by optical diffraction may be compensated for regardless of a result of analyzing a light source.

The electronic image may correct the image by compensating for at least one of the resolution decrease and/or the SNR decrease. For example, the electronic device may improve at least one of the resolution decrease and/or the SNR decrease included in the obtained image, based on a model trained based on machine learning or on signal processing. However, a method of compensating for or correcting a degraded image is not limited to such a machine learning-based model or signal processing, and other methods may also be used without limitation to compensate for a degraded image.

In operation 440, the electronic device may determine an intensity of the light source in the image. Here, an intensity of a light source may not be an absolute intensity of the light source, but a relative intensity of the light source captured by the camera module and appearing in the image, and may be affected by settings (e.g., an exposure time and an aperture value) of the camera module. For example, even for a light source with a high absolute intensity, an intensity of the light source appearing in an image may be low (or weak) by decreasing an exposure time or decreasing a diameter of a camera aperture. In contrast, even for a light source with a low absolute intensity, an intensity of the light source appearing in an image may be high (or strong) by increasing the exposure time or increasing the diameter of the camera aperture.

A captured light source may be represented as being saturated, and thus information on pixel values (e.g., RGB color values) may not be sufficient alone to determine the intensity of the light source. Thus, the electronic device may determine the intensity of the light source based on a length of a light beam protruding from a boundary of the light source in the image. This may be based on a characteristic that diffraction, light blurring, and/or light splitting by a UDC structure become intensified when an intensity of a light source in an image increases. Examples of determining an intensity of a light source based on a length of a light beam will be described in detail with reference to FIGS. 5 and 6.

The electronic device may determine the intensity of the light source in the image using signal processing based on segmentation of a saturated pixel area in the image or using a model to trained in advance based on machine learning. For example, the electronic device may determine the intensity of the light source to be high or strong when the length of the light beam protruding from the boundary of the light source in the image is greater than or equal to a threshold value (e.g., a 20-pixel length), and determine the intensity of the light source to be low or weak when the length of the light beam is less than the threshold value.

The determining of the intensity of the light source in the image may be performed (Intensity of Light Source 440→Strong) to determine whether a rainbow artifact and/or a UDC flare artifact, which will be described later, is present in the image. For example, in response to a determination (Weak in operation 440) that the intensity of the light source is low or weak in operation 440, operation 450 may be performed subsequently. In response to a determination (Strong in operation 440) that the intensity of the light source is high or strong in operation 40, operation 460 may be performed subsequently.

When the intensity of the light source determined in operation 440 the rainbow artifact occurs, however a determination is made whether the light source is in a particular location. If the light source is not in the particular position, operation 470 may be performed to additionally remove or reduce the rainbow artifact. If the light source is in the particular position, during operation 480, the rainbow artifact and flare artifact are removed or reduced.

FIG. 4B illustrates an example of using a plurality of threshold values to determine an intensity of a light source. In operation 441, the electronic device may determine whether the intensity of the light source in the image is week, strong, or extremely strong. An intensity value of a light source from which a rainbow artifact occurs and an intensity value of a light source from which a UDC flare artifact occurs may be different from each other. For example, the intensity value of the light source from which the rainbow artifact occurs may be lower than the intensity value of the light source from which the UDC flare artifact occurs. When the intensity of the light source determined in operation 441 is greater than the intensity value of the light source from which the rainbow artifact occurs but less than the intensity value of the light source from which the UDC flare artifact occurs, operation 470 may be immediately performed without operation 460 of analyzing a position of the light source. Thus, it is possible to reduce an amount of unnecessary computation.

For example, the electronic device may determine the intensity of the light source to be weak when the length of the light beam protruding from the boundary of the light source in the image is less than a first threshold value (e.g., a 20-pixel length), determine the intensity of the light source to be strong when the length is greater than or equal to the first threshold value and less than a second threshold value (e.g., a 40-pixel length), and determine the intensity of the light source to be extremely strong when the length is greater than or equal to the second threshold value. When the intensity of the light source is determined to be weak in operation 441, the electronic device may perform operation 450. When the intensity of the light source is determined to be strong in operation 441, the electronic device may perform operation 470 without performing operation 460 of analyzing a position of the light source. In addition, when the intensity of the light source is determined to be extremely strong in operation 441, the electronic device may perform operation 460 subsequently. Although to be described later, when the position of the light source is in a preset area or overlaps the preset area by a preset ratio or greater in operation 460, operation 480 may be performed subsequently.

Removing/Reducing Light Source Artifact

Referring back to FIG. 4A, in operation 450, the electronic device may remove or reduce one or more artifacts detected in the image based on results of the determining described above. Even when an image of a weak light source is captured, a light source artifact in which a shape of the light source is distorted may occur. The light source artifact may occur based on at least one of optical diffraction, light blurring, and light splitting, which occur due to a regular structural characteristic of the display when an image of a light source disposed in front of the display is captured by the camera module, and may indicate that the light source appears differently from its original shape in the captured image.

The electronic device may correct a distorted shape of the light source shown in the image. For example, the electronic device may correct the distorted shape of the light source in the image to be a similar shape that would appear in an image captured by a camera module that is not disposed under the display module, or to another aesthetically designed shape (e.g., a shape of the light source to which a special effect of fogging is applied), thereby removing or reducing the light source artifact. For example, the electronic device may remove or reduce the light source artifact based on a model trained in advance based on machine learning or on signal processing. The model may be trained based on a dataset for light source processing to which even a saturated area around a light source is applied in addition to diffraction of light. That is, the electronic device can be trained with images that were taken with camera module 180 which was with UDC conditions, and an image of the same scene that was captured by a camera that was not with UDC conditions. Based on a comparison of the foregoing images, the electronic device can be trained to remove or reduce light source artifact.

In addition, the operation of compensating for at least one of a resolution decrease and/or an SNR decreases that may occur regardless of the presence or absence of a light source in an image obtained by a UDC module may also be performed in operation 450.

In operation 460, the electronic device may determine whether the light source is disposed in a preset area in the image. For example, the electronic device may determine whether a position of the light source in the image belongs to the preset area determined based on the structural characteristic of the display or the position of the light source overlaps the preset area by a preset ratio (e.g., 70%) or greater. For example, the preset area may be a circular area having a radius set in advance in a unit of the number of pixels based on coordinate values of a pixel which is a reference center of a horizontal axis and a vertical axis of the captured image. The electronic device may determine whether the position of the light source is in the preset area by determining the position of the light source using signal processing based on object localization or segmentation of a saturated pixel area in the image or on a model trained in advance based on machine learning.

The determining of whether the light source is disposed in the preset area in the image may be performed to determine whether a UDC flare artifact, which will be described later, is preset in the image. When the light source is determined not to be present in the preset area in operation 460, operation 470 may be performed subsequently. Conversely, when the light source is determined to be preset in the preset area in operation 460, operation 480 may be performed subsequently.

According to an example embodiment, when the image obtained in operation 410 is a preview image generated in real time by the camera module, performing the operation of removing or reducing various artifacts occurring in all the images obtained in real time may be ineffective in terms of a performing speed, and thus the operation of removing or reducing some artifacts may not be applied to the preview image. For example, an operation of removing or reducing a UDC flare artifact may not be performed on the preview image. In this example, at least a part of operations 460 and 480 may be omitted.

Removing/Reducing the Light Source and Rainbow Artifacts

In operation 470, the electronic device may remove or reduce one or more artifacts detected in the image based on results of the determining described above. For example, when the camera module disposed under the display captures an image of a light source with a strong intensity, a rainbow artifact in which a color around the light source is distorted by light blurring and strong light splitting from optical diffraction caused by the structural characteristic of the display may be shown in the image. The rainbow artifact may have a color around the light source that appears different from the original color due to a deviation in light blurring and light splitting for each wavelength of light.

The electronic device may correct the color around the light source in the image. For example, the electronic device may correct the color around the light source to be similar to a color around the light source had the image been captured by a camera that was not an UDC The foregoing removes or reduces the rainbow artifact. For example, the electronic device may remove or reduce the rainbow artifact based on a model trained in advance based on machine learning or on signal processing. The model may be trained based on a dataset for light source processing to which even a saturated area around the light source is applied in addition to diffraction of light. For example, the dataset for light source processing may include a pair of an input image obtained by capturing a scene (e.g., a scene including a light source with a preset brightness or greater) that satisfies a rainbow artifact occurring condition by a UDC and a ground truth image obtained by capturing the same scene by an externally exposed camera module. Alternatively, an image including the rainbow artifact may be obtained from an image captured by an externally exposed camera module through image post-processing by adding, in advance, a virtual digital lighting with a brightness that generates the rainbow artifact to the image captured by a camera that is not UDC, generating virtual diffraction through a point spread function (PSF) to which a characteristic of the display is applied and through a convolution operation between the images, and clipping a pixel value using a preset threshold value. In this case, an image before the virtual diffraction is generated may be the ground truth image and an image obtained after the virtual diffraction may be the input image, and the ground truth image and the input image may constitute the pair. The foregoing training may occur at manufacture and preinstalled in the electronic device before sale.

In addition, as described, the operation of compensating for at least one of a resolution decrease and/or an SNR decrease, which may occur in an image obtained by a UDC module, may also be performed in operation 470. In addition, a light source artifact may occur due to the presence of the light source in the image, and thus the operation of removing or reducing the light source artifact may also be performed in operation 470.

Remove/Reduce Light Source, Rainbow, and Flare Artifacts

In operation 480, the electronic device may remove or reduce one or more artifacts detected in the image based on results of the determining described above. When the light source is present in the preset area in the image, a UDC flare artifact appearing in a shape of a pattern that is based on a structural shape of the display may be shown in the image. For example, when a light source with a strong intensity is present at a certain position in an image, in addition to light blurring or light splitting from optical diffraction, an unintended internal reflection may occur between the display and the camera module, and a UDC flare artifact in which a wiring and pixel arrangement of the display is expanded and distorted may occur in a portion of the image. The UDC flare artifact may occur as the structural characteristic of the display is shown in an image, and be different in shape from a flare artifact shown in an image captured by an externally exposed camera module and may overlap a signal of the captured image. Thus, the UDC flare artifact may provide a user with a strong sense of difference. An example of the occurrence of the UDC flare artifact will be described in detail with reference to FIG. 8.

The UDC flare artifact may more clearly occur when a light source with a strong intensity is present at a specific position. Thus, whether the light source is disposed in an area where the UDC flare artifact is clearly shown may need to be determined. When the light source is determined to be disposed in the area, an operation of removing or reducing the UDC flare artifact may be performed on a corresponding image. The electronic device may remove or reduce a pattern shown as overlapping in a captured image or correct it to be shown as similar to a flare artifact shown in an image captured by a general camera module that is not disposed under the display, thereby removing or reducing the UDC flare artifact. For example, the electronic device may remove or reduce the UDC flare artifact based on a model trained in advance based on machine learning or on signal processing.

Although to be described in detail later, when a light source is present at a position with a brightness based on a position and/or structure of hardware such as the display and the camera module, a position at which the UDC flare artifact occurs may be determined. Here, the brightness may not be an absolute brightness of the light source, but a brightness of the light source shown in a captured image. In addition, information on the position at which the UDC flare artifact is predicted to occur may be additionally used to remove or reduce the UDC flare artifact. By partially performing the operation of removing or reducing the UDC flare artifact only on the position at which the UDC flare artifact is predicted to occur, it is possible to prevent an excessive increase in an amount of computation by the operation of removing or reducing the UDC flare artifact.

In addition, the operation of compensating for at least one of a resolution decrease and/or an SNR decrease and the operation of removing or reducing the light source artifact and the rainbow artifact may also be performed in operation 480.

The artifacts described above may occur based on preset conditions, such as, for example, the presence or absence of a light source in a captured image, an intensity of the light source, and a position of the light source. For example, since the UDC flare artifact appears overlapping the captured image, it may not be easy to distinguish and detect the artifact directly from the image, and various indirect methods based on a light source analysis may be used to effectively detect the artifact. In addition, the effective detection may enable the removal or reduction of a specific artifact only when it is needed, and thus prevent unnecessary operations from being performed.

Although a model (e.g., a classifier) for determining and a model for removing or reducing an artifact are illustrated separately in FIGS. 4A and 4B for the convenience of description, examples are not limited thereto. For example, the model for determining and the model for removing or reducing an artifact may also be implemented as a single model. In addition, a model for correcting an image, a model for removing or reducing a light source artifact, a model for removing or reducing a rainbow artifact, and/or a model for removing or reducing a UDC flare artifact may be implemented as independent models. In addition, at least one required model among the models may be applied to corresponding operations (e.g., operations 430, 450, 470, and 480) in corresponding situations, or at least one of the operations (e.g., operations 430, 450, 470, and 480) performed in corresponding situations may be implemented by a single model and the single model corresponding to the operations (e.g., operations 430, 450, 470, and 480) may be applied.

According to an example embodiment, an operation method of an electronic device (e.g., the electronic device 101 of FIG. 1 or the electronic device 300 of FIG. 3) may include determining an intensity of a light source shown in an image obtained by a camera module disposed under a display, determining whether the light source is disposed in a preset area in the image in response to the intensity of the light source being greater than a preset threshold value, and reducing one or more artifacts from or in the image in response to the one or more artifacts being detected in the image based on results of the determining.

When the light source is included in the image, the reducing may include reducing a first artifact in which a shape of the light source is distorted in the image.

When the intensity of the light source is greater than the preset threshold value, the reducing may include reducing a second artifact in which a color around the light source is distorted in the image.

When the light source is present in the preset area in the image, the reducing may include reducing a third artifact appearing in the image in a pattern that is based on a structural shape of the display.

Image Examples

Figure 5:
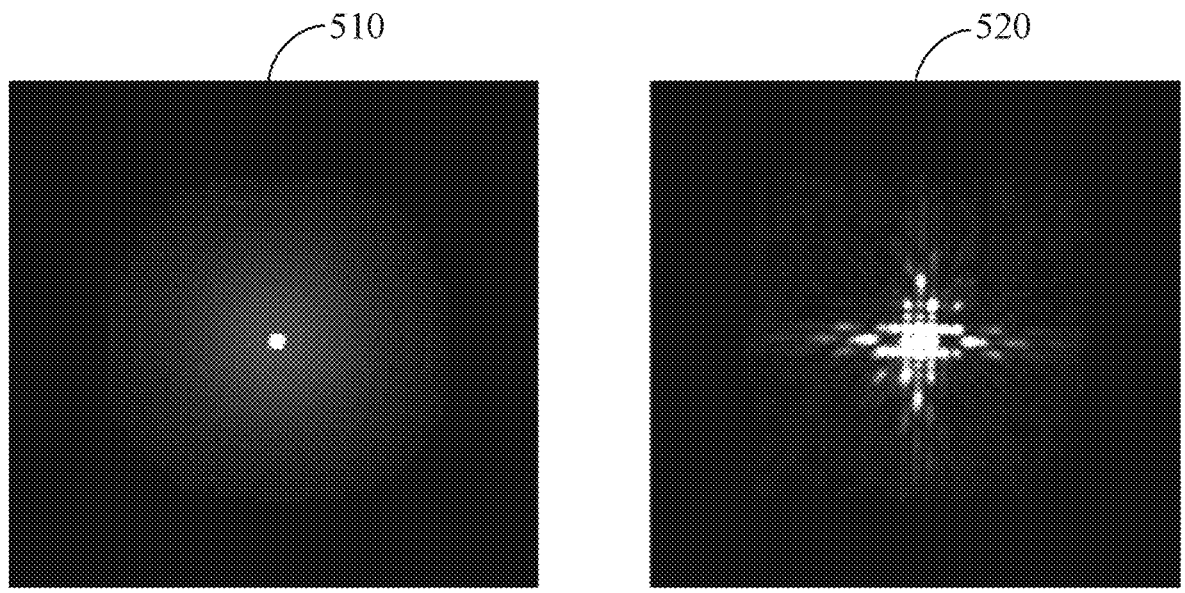
FIGS. 5 and 6 are images illustrating example operations of determining an intensity of a light source according to various embodiments.
Figure 6:
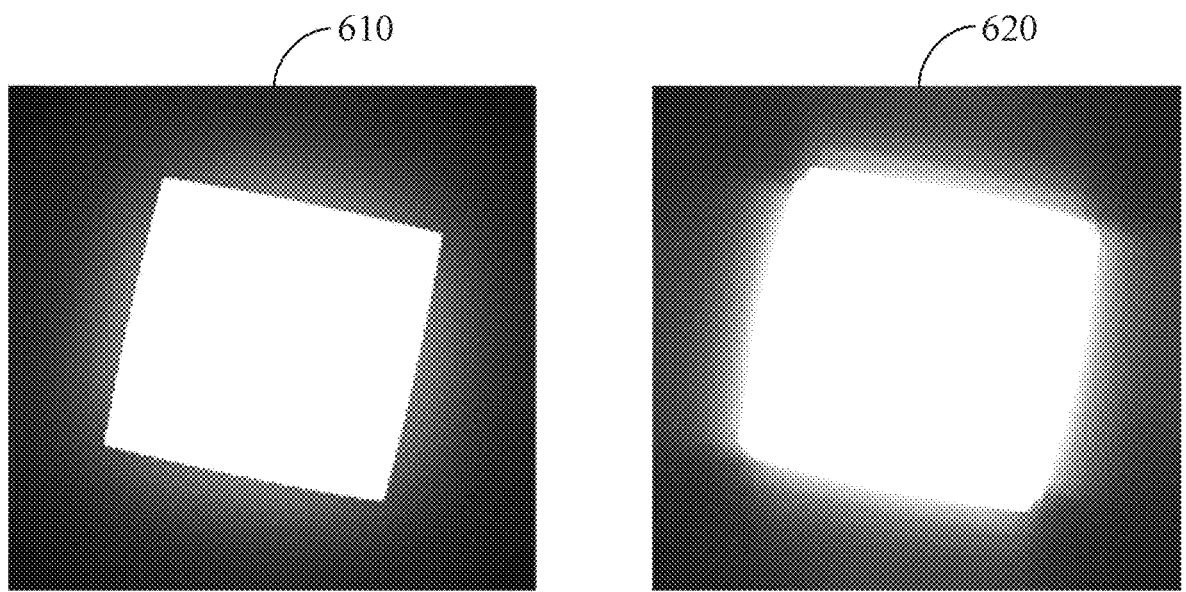

FIGS. 5 and 6 are images illustrating example operations of determining an intensity of a light source according to various embodiments.

In FIG. 5, there are a first image 510 obtained when a camera module of which a portion is exposed to the outside captures an image of a point light source, and a second image 520 obtained when a UDC module captures an image of the point light source. For example, in a case in which an image of a light source such as a lighting is captured by a camera, an intensity of light emitted from the light source may be extremely strong compared to a surrounding background, and thus pixels near the light source may be saturated. Thus, dissimilar to a case in which an image of a light source is captured by the camera module exposed to the outside, an image of a light source captured by the UDC module may have a broader area of light blurring and light splitting due to diffraction of light.

Comparing the first image 510 and the second image 520, a light beam extending from a boundary of the light source is shown in the second image 520 captured by the UDC module due to light blurring and light splitting. Images 510 and 520 can be used to train the electronic device. By comparing these images the electronic device can ascertain a characteristic that, when an intensity of a light source in an image increases, a length of a light beam in the image increases and an area of saturated pixel values increases. Thus, an intensity of the light source in the second image 520 may be determined based on the length of the light beam that exceeds a threshold pixel value. As described above, the intensity of the light source used herein may be a relative intensity. In FIG. 6, there are a first image 610 obtained when a camera module of which a portion is exposed to the outside captures an image of a surface light source, and a second image 620 obtained when a UDC module captures an image of the surface light source. For example, it is verified that the first image 610 has the light source that maintains its original shape, and the second image 620 has a light beam extending from a boundary of the light source. Images 610 and 620 can be used to train the electronic device. By comparing these images, it can be ascertained that a length of such a light beam increases as an intensity of a light source in a captured image increases. Thus, an intensity of the light source in the second image 620 may be determined based on the length of the light beam in the second image 620.

Figure 7:
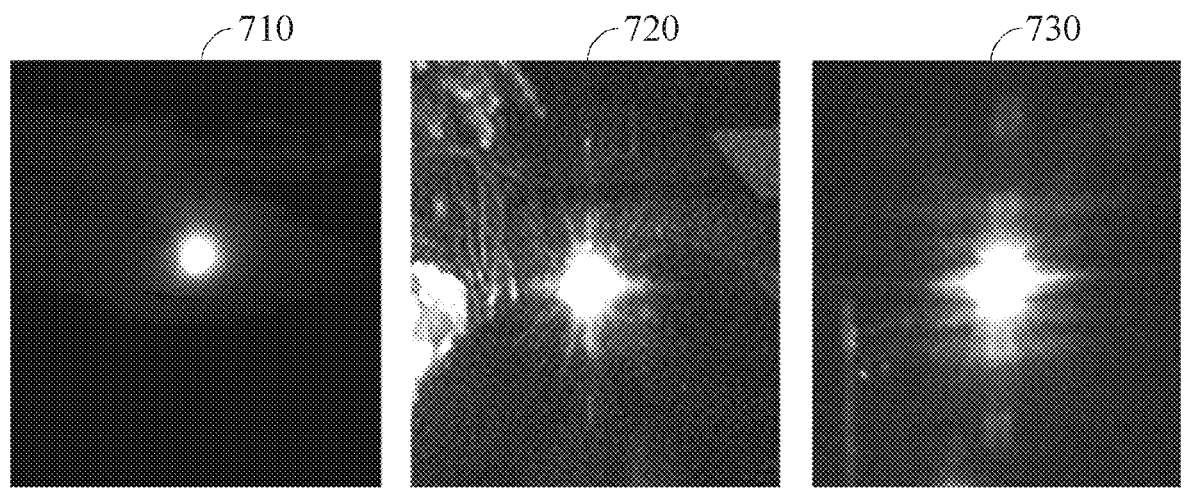
FIG. 7 is images illustrating example light source artifacts and rainbow artifacts according to various embodiments.

FIG. 7 is images illustrating example light source artifacts and rainbow artifacts according to various embodiments. In FIG. 7, there are a first image 710 obtained as a camera module of which a portion is exposed to the outside captures an image of a light source, and a second image 720 and a third image 730 obtained as a UDC module captures an image of the light source. The second image 720 may be obtained when the light source is captured with a weak intensity and have a light source artifact in which a shape of the light source is distorted due to light blurring and light splitting. The third image 730 may be obtained when the light source is captured with a strong intensity and have both a light source artifact in which the shape of the light source is distorted and a rainbow artifact in which a color around the light source is distorted due to strong light splitting.

According to an example embodiment, the first image 710 without the light source artifact and the second image 720 having the light source artifact may be used as training data to train a model for removing or reducing the light source artifact such that the model is trained to output the first image 710 when the second image 720 is input. Similarly, the third image 730 having the rainbow artifact, and the first image 710 or the second image 720 without the rainbow artifact may be used as training data to train a model for removing or reducing the rainbow artifact.

Flare Artifact

Figure 8:
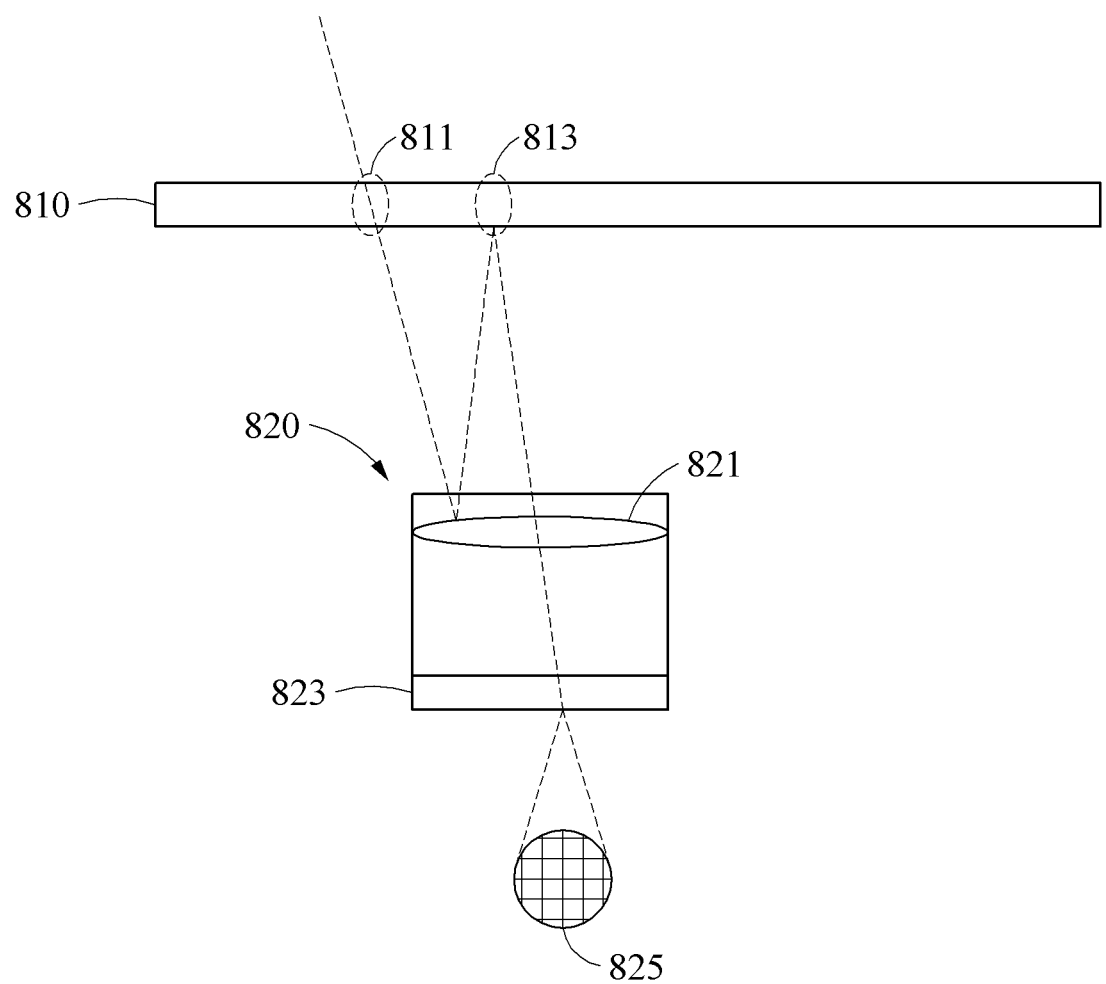
FIG. 8 is a diagram illustrating an example where an under-display camera (UDC) flare artifact occurs according to various embodiments.

FIG. 8 is a diagram illustrating an example where a UDC flare artifact occurs according to various embodiments.

Referring to FIG. 8, external light may pass through a display 810 (e.g., the display module 160 of FIG. 1 or the display 310 of FIG. 3) and reach a camera module 820 (e.g., the camera module 180 of FIG. 1 or 2, or the camera module 320 of FIG. 3). Under a specific condition, the light reaching the camera module 820 may be reflected from a lens 821 (e.g., the lens assembly 210 of FIG. 2) of the camera module 820 and transmitted back to the display 810, and then re-reflected from the display 810. The re-reflected light may be sensed by an image sensor 823 of the camera module 820 and displayed as a part of an image. As described above, pixels and wires are arranged in a regular structure in the display 810, and a transmittance of a specific portion 813 (e.g., a metal wire, a light-shielding film, and a pixel of the display 810) may be lower than that of another portion 811. Thus, the light may not pass through the portion 813. Such a structural shape of the display 810 may result in a pattern in which an intensity of a wavefront of the light is not uniform. In an optical path in which the light having the wavefront with such a non-uniform intensity is internally reflected again from a rear end of the display 810 after being reflected from a surface of the lens 821, a pattern 825 (e.g., a grid pattern) that is based on the structural shape of the display 810 may be partially shown as a UDC flare artifact in the image. This may normally occur, regardless of the intensity of the light. However, when an image is captured under a condition that a relatively extremely strong external light source is present in a scene, a strong pattern that is identifiable with naked eyes may appear. In the grid pattern 825, a dark portion may correspond to a portion with a relatively low transmittance in the display 810, and a bright portion may correspond to a portion with a relatively high transmittance in the display 810.

In consideration of a position of the display 810 and the camera module 820, whether the UDC flare artifact occurs may be determined in advance based on an intensity and a position of a light source in an image. For example, the UDC flare artifact may appear and then disappear in the image as the light source moves from a center to an edge of the image. In the image, areas in which the UDC flare artifact occurs may be identified in advance and configured in a form of a map. Using this map (e.g., a circle having a radius from the center of the image), whether the UDC flare artifact occurs or not may be determined. For example, a condition in which the UDC flare artifact occurs may be when the position of the light source is inside the circle. When the position of the light source is outside the circle, the UDC flare artifact may not appear even when the brightness is extremely high or strong.

In addition, in a case in which the size of an area of the light source is relatively large, the UDC flare artifact may occur when a ratio of the circle overlapping the area of the light source is greater than or equal to a threshold value. Further, in consideration of the structural shape of the display 810, a position at which the UDC flare artifact occurs in the image may be predicted based on the position of the light source. Based on this, an operation of removing or reducing the UDC flare artifact may be selectively performed on an area in the image. Thus, the operation of removing or reducing the UDC flare artifact may not need to be performed on all areas in the image, and it is thus possible to increase the efficiency of image post-processing.

In certain embodiments, the ISP 260 can perform this detection with live images. When the user decides to capture an image, based on detection from the live image, the ISP 260 can know, a priori, where to remove/reduce the UDC flare artifact.

Figure 9:
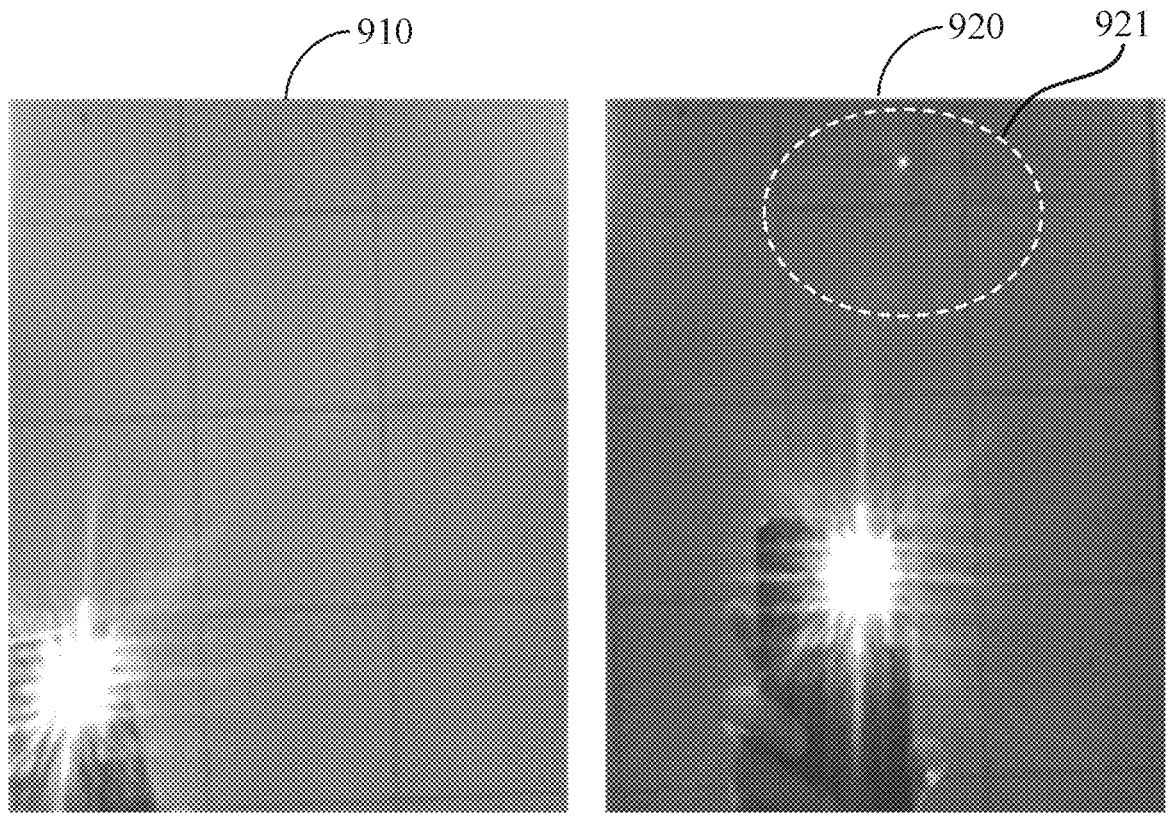
FIG. 9 is images illustrating example UDC flare artifacts according to various embodiments.

FIG. 9 are images illustrating example UDC flare artifacts according to various embodiment. In FIG. 9, there are images 910 and 920 obtained by capturing an image of a light source from different positions. The first image 910 may be obtained by capturing an image of a light source present at a first position in the image, and may have a light source artifact or a rainbow artifact around the light source without the occurrence of a UDC flare artifact. The second image 920 may be obtained by capturing an image of a light sourced present at a second position in the image, and may have a USD flare artifact in which a pattern corresponding to pixels and wires of a display is repeated in a portion 921 of the image. As shown in the second image 920, the UDC flare artifact may not be easily detectable through direct detection because it is shown overlapping an existing image signal. However, as described above, an analysis of a brightness and position of a light source may be used to robustly detect the UDC flare artifact.

Figure 10:
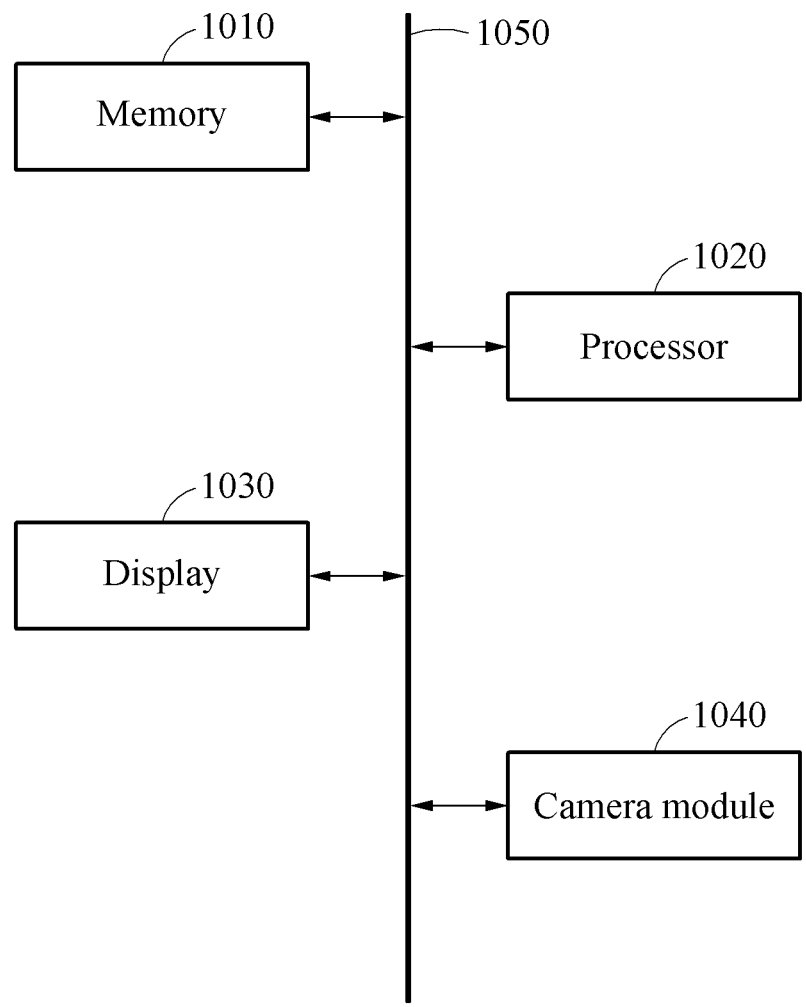
FIG. 10 is a diagram illustrating an example electronic device according to various embodiments.

FIG. 10 is a diagram illustrating an example electronic device according to various embodiments. Referring to FIG. 10, an electronic device 1000 (e.g., the electronic device 101 of FIG. 1 or the electronic device 300 of FIG. 3) may include a memory 1010 (e.g., the memory 130 of FIG. 1 or the memory 250 of FIG. 2), a processor 1020 (e.g., the processor 120 of FIG. 1 and/or the ISP 260 of FIG. 2), a display 1030 (e.g., the display module 160 of FIG. 1 or the display 310 of FIG. 300), and a camera module 1040 (e.g., the camera module 180 of FIG. 1 or 2 or the camera module 320 of FIG. 3). The memory 1010, the processor 1020, the display 1030, and the camera module 1040 may communicate with each other through an interface 1050.

The memory 1010 may include computer-readable instructions. The processor 1020 may perform the operations described above when the instructions stored in the memory 1010 are executed by the processor 1020. The memory 1010 may be a volatile memory or a non-volatile memory.

The memory 1010 may store a model for reducing one or more artifacts from images The processor 1020 may be a device that executes instructions or programs or controls the electronic device 1000. The processor 1020 may determine an intensity of a light source shown in an image obtained by the camera module 1040 disposed under the display 1030, determine whether the light source is present in a preset area in the image when the intensity of the light source is greater than a preset threshold value, and remove or reduce one or more artifacts from or in the image when the one or more artifacts are detected in the image based on results of the determining. In addition, the processor 1020 may process the operations of the electronic device 1000 described above. Although the operations are described as being processed by the processor 1020 for the convenience of description, at least a portion of the operations may be performed by an ISP (e.g., the ISP 260 of FIG. 2).

As described above, the electronic device 1000 may selectively apply, to an image, an operation of removing or reducing an artifact indirectly detected in the image, and may thus improve a performing speed. Since processing for image correction or removal or reduction of an artifact may have a relatively high computational complexity, performing the processing on each frame obtained by the camera module 1040 in a limited environment such as a mobile terminal may be a demanding burden in terms of the performing speed. In addition, when operations of removing or reducing various types of artifacts are applied to one frame, such a demanding burden may increase. However, as described above, by applying only an operation of removing or reducing a specific type of artifact when needed, it is possible to increase the performing speed. In addition, by selectively removing or reducing an artifact, it is possible to prevent an image processing artifact that may occur due to an unnecessary removing or reducing operation.

Further, light blurring and light splitting may be a physically inevitable phenomenon in a case in which the camera module 1040 is disposed under a repetitive structure of the display 1030. Thus, by improving such light blurring and/or light splitting along with image quality degradation caused by optical diffraction, it is possible to improve the efficiency of image correction.

According to an example embodiment, the electronic device 1000 may include the display 1030, the camera module 1040 disposed under the display 1030 and configured to generate an image by sensing light passing through the display 1030, and the processor 1020 configured to determine an intensity of a light source in the image, determine whether the light source is present in a preset area in the image when the intensity of the light source is greater than a preset threshold value, and reduce one or more artifacts from or in the image based on results of the determining when the artifacts are detected in the image.

When the light source is captured in the image, the processor 1020 may reduce a first artifact in which a shape of the light source is distorted in the image. The first artifact may occur based on at least one of optical diffraction, light blurring, and light splitting, which occur due to a structural characteristic of the display 1030 when the camera module 1040 captures an image of a light source disposed in front of the display 1030. The processor 1020 may remove or reduce the first artifact by correcting the distorted shape of the light source to be a shape of the light source captured by a second camera module that is exposed to the outside.

When the intensity of the light source is greater than the preset threshold value, the processor 1020 may reduce a second artifact in which a color around the light source is distorted in the image. The processor 1020 may remove or reduce the second artifact by correcting the color around the light source to be a color around the light source captured by the externally exposed second camera module.

When the light source is present in the preset are in the image, the processor 1020 may reduce a third artifact appearing in the image in a pattern that is based on the structural shape of the display 1030. The third artifact may occur at a position determined based on the position of the light source in the image as light reflected from a lens of the camera module 1040 is re-reflected from the display 1030 and is then detected by the camera module 1040.

According to an example embodiment, the processor 1020 may selectively apply such a reducing operation corresponding to a type of an artifact detected in the image.

According to an example embodiment, the processor 1020 may determine the intensity of the light source based on a length of a light beam extending from a boundary of the light source in the image.

According to an example embodiment, the processor 1020 may determine whether the position of the light source in the image belongs to a preset area determined based on a structural characteristic of the display 1030 or the position of the light source overlaps the preset area by a preset ratio or greater.

According to an example embodiment, the processor 1020 may determine whether the light source is captured in the image. When the light source is included in the image, the processor 1020 may determine the intensity of the light source. The processor 1020 may determine whether the light source is included in the image based on a size and shape of a saturated pixel area in the image.

According to an example embodiment, the image generated by the camera module 1040 may be an image captured by the camera module 1040 or a preview image generated in real time by the camera module 1040, according to a user manipulation or a predetermined setting.

According to an example embodiment, the processor 1020 may compensate for at least one of a resolution decrease and an SNR decrease that may occur in the image due to optical diffraction occurring due to the structural characteristic of the display 1030, irrespective of results of the determining.

The example embodiments described in the present disclosure and the drawings are intended merely to present specific examples in order to aid in understanding of the present disclosure, but are not intended to limit the scope of the present disclosure. It will be apparent to those skilled in the art that various modifications based on the technical spirit of the present disclosure, as well as the disclosed example embodiments, can be made. Therefore, the scope of the disclosure is defined not by the detailed description, but by the claims and their equivalents, and all variations within the scope of the claims and their equivalents are to be construed as being included in the disclosure.

What is claimed is:

1. An electronic device, comprising:
a display;
a camera module disposed under the display and configured to generate an image by sensing light from an outside passing through the display; and
a processor configured to determine an intensity of a light source in the image, determine whether a predetermined portion of the image includes the light source when the intensity of the light source is greater than a preset threshold value, and when the predetermined portion includes the light source, reduce a flare artifact in the image.

2. The electronic device of claim 1, wherein the processor is configured to:
when the light source is captured in the image, reduce a first artifact in which a shape of the light source is distorted in the image.

3. The electronic device of claim 2, wherein the first artifact occurs from at least one of optical diffraction, light blurring, and light splitting, which occur due to a structural characteristic of the display when the camera module captures an image of a light source disposed in front of the display.

4. The electronic device of claim 2, wherein the processor is configured to:
remove or reduce the first artifact by correcting the distorted shape of the light source to be a shape of the light source captured by a second camera module exposed to the outside.

5. The electronic device of claim 1, wherein the processor is configured to:
when the intensity of the light source is greater than the threshold value, reduce a second artifact in which a color around the light source is distorted in the image.

6. The electronic device of claim 5, wherein the processor is configured to:
remove or reduce the second artifact by correcting the color around the light source to be a color around the light source captured by a second camera module exposed to the outside.

7. The electronic device of claim 1, wherein the processor is configured to:
when the predetermined portion includes the light source, reduce a third artifact appearing in the image in a pattern that is based on a structural shape of the display.

8. The electronic device of claim 7, wherein the third artifact occurs at a position determined based on a position of the light source in the image as light reflected from a lens of the camera module is detected by the camera module after being reflected again from the display.

9. The electronic device of claim 1, wherein the processor is configured to:
selectively apply, to the image, a reducing operation corresponding to a type of an artifact detected in the image.

10. The electronic device of claim 1, wherein the processor is configured to:
determine the intensity of the light source based on a length of a light beam extending from a boundary of the light source in the image.

11. The electronic device of claim 1, wherein the processor is configured to:
determine whether a position of the light source in the image belongs to the predetermined portion is determined based on a structural characteristic of the display or determine by whether the position of the light source overlaps the predetermined portion by a preset ratio or greater.

12. The electronic device of claim 1, wherein the processor is configured to:
determine whether the light source is captured in the image, and determine the intensity of the light source in response to a determination that the light source is captured in the image.

13. The electronic device of claim 12, wherein the processor is configured to:
determine whether the light source is included in the image based on a size and a shape of a saturated pixel area in the image.

14. The electronic device of claim 1, wherein the image generated by the camera module is an image captured by the camera module or a preview image generated in real time by the camera module, based on a user manipulation or a predetermined setting.

15. The electronic device of claim 1, wherein the processor is configured to:
compensating for at least one of a resolution decrease or a signal-to-noise ratio (SNR) decrease that occurs in the image due to optical diffraction occurring due to a structural characteristic of the display, irrespective of results of the determining.

16. The electronic device of claim 1, wherein the predetermined portion is a central region of the image.

17. The electronic device of claim 1, further comprising memory storing a model for reducing one or more artifacts from images and wherein the processor is configured to use the model to reduce the flare artifact.

18. An operation method of an electronic device, comprising:
- determining an intensity of a light source in an image obtained by sensing light from an outside passing through a display to a camera module disposed under the display;
- in response to the intensity of the light source being greater than a preset threshold value, determining whether a predetermined portion of the image includes the light source; and
- when the predetermined portion includes the light source, reducing a flare effect in the image.

19. The operation method of claim 18, wherein the reducing comprises:
- in response to the light source being comprised in the image, reducing a first artifact in which a shape of the light source is distorted in the image.

20. The operation method of claim 18, wherein the reducing comprises:
- in response to the intensity of the light source being greater than the preset threshold value, reducing a second artifact in which a color around the light source is distorted in the image.

21. The operation method of claim 18, wherein the reducing comprises:
- in response to the predetermined portion of the image including the light source, reducing a third artifact appearing in the image in a pattern that is based on a structural shape of the display.

22. A non-transitory computer-readable storage medium storing instructions that, when executed by a processor, cause the processor to perform the operation method of claim 18.

* * * * *